United States Patent [19]

Stedham

[11] Patent Number: 4,552,307
[45] Date of Patent: Nov. 12, 1985

[54] PET REPELLENT DEVICE

[76] Inventor: Yolanda Stedham, 823 N. Austin Ave., Apt. 2, Inglewood, Calif. 90302

[21] Appl. No.: 519,968

[22] Filed: Aug. 3, 1983

[51] Int. Cl.⁴ ............................................. A01M 13/00
[52] U.S. Cl. ......................................... 239/57; 43/131; 215/307; 220/367; 239/58; 239/276
[58] Field of Search ................................ 239/34, 53–60, 239/271, 273, 276; 43/124, 129, 131, 132.1; 220/206, 290, 303, 367, 345, DIG. 27; 215/307, 313, 314

[56] References Cited

U.S. PATENT DOCUMENTS

| | | | |
|---|---|---|---|
| 974,444 | 11/1910 | Stauffiger | 215/307 |
| 1,577,351 | 3/1926 | Alvarez | 43/131 |
| 2,169,499 | 8/1939 | Niemeyer | 43/129 X |
| 2,750,707 | 6/1956 | Ekstedt | 43/131 |
| 2,837,861 | 6/1958 | Graham, Sr. | 43/131 |
| 2,961,167 | 11/1960 | Skaist | 239/58 X |
| 3,405,688 | 10/1968 | Gerhardi | 43/131 X |
| 3,790,081 | 2/1974 | Thornton et al. | 239/55 |

FOREIGN PATENT DOCUMENTS 2551185  5/1977  Fed. Rep. of Germany ........ 239/57

Primary Examiner—Andres Kashnikow
Attorney, Agent, or Firm—Howard A. Kenyon

[57] ABSTRACT

A pet repellent device for use outdoors consisting of a refillable vented container is disclosed. The container, which is secured to the ground around shrubs and grass areas, is vented to allow the vapors from the liquid repellent in the container to flow into the air in the area that is desired to keep free of pets. The pets smell the repelling vapors, which are harmless, and completely avoid the area.

1 Claim, 6 Drawing Figures

U.S. Patent    Nov. 12, 1985    4,552,307
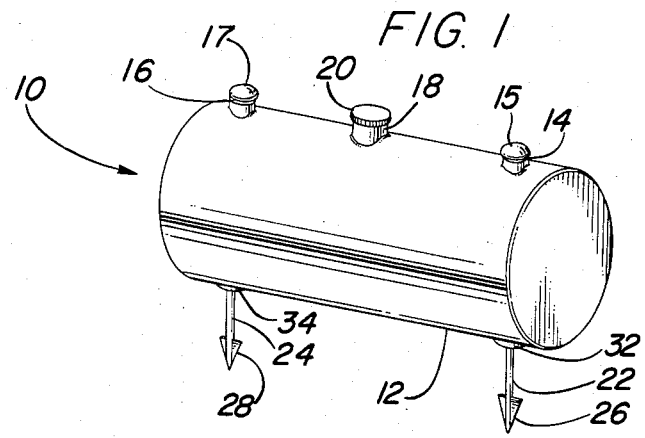
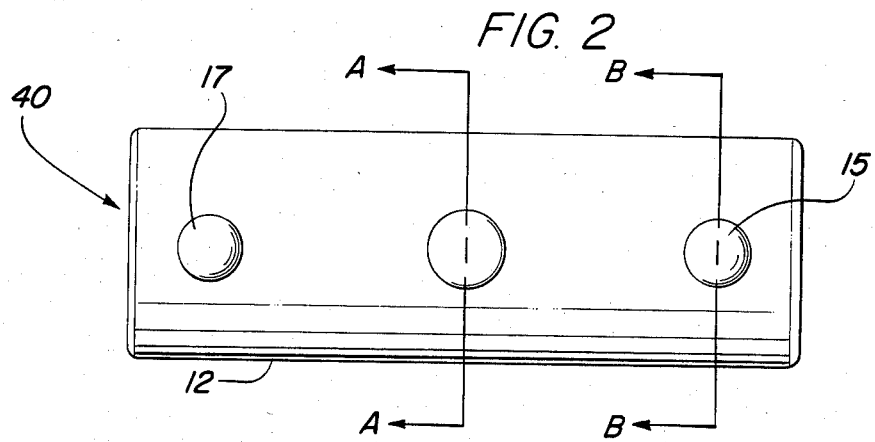
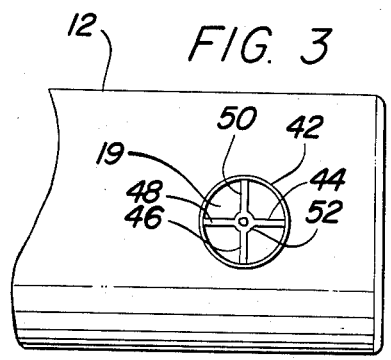
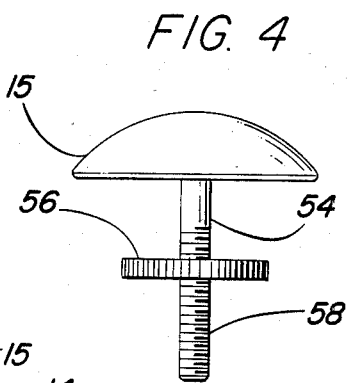
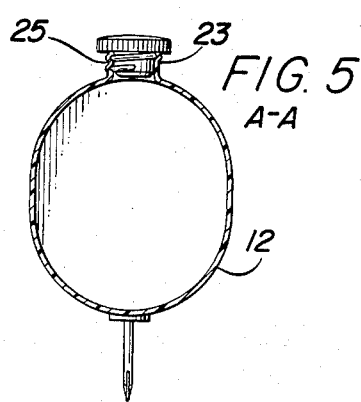
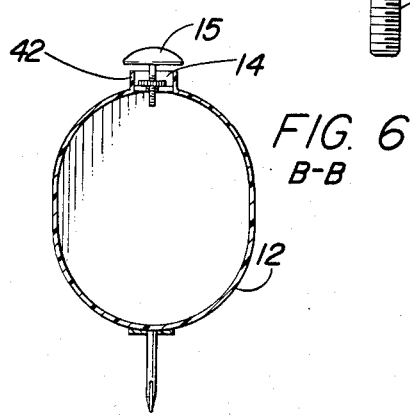

PET REPELLENT DEVICE

BACKGROUND OF THE INVENTION (a) Field of the Invention

This invention generally relates to a pet repellent device. More specifically, this invention relates to a container to be used in the yard that allows harmless repelling vapors to escape thereby keeping pets away from a specific area.

(b) Description of the Prior Art

Pet repellent is available in dry form, in pellets or dust and in liquid form, primarily as a spray. The dry pellets called REPEL TM are manufactured by Chacon Chemical Corp. in the City of Commerce, Calif. The dust is called Holiday ® Repellent and is manufactured by Pet Chemical Inc. in Miami Springs, Fla. The liquid form is packaged primarily as a spray. Some of the liquid forms can be used either indoors or outdoors, however, most of the containers state that the spray should not be used on delicate shrubs and ornamental plants. Some of the liquid repellents on the market in pressurized spray cans are "Dog Away" dog repellent manufactured by Whitmore Research Labs Inc., St. Louis, Mo., Shun ® by Zema ® Corp., Research Triangle Park, N.C., and Holiday ® Pet Repellent, Pet Chemical Inc., Miami Springs, Fla. All of the above repellents have the problem of being dissipated when placed on the lawn or shrubs and thereafter sprinkling the lawn or shrubs. The dust and pellets melt and wash away and the spray is washed off of the shrubs or grass almost immediately. This problem can also occur when a rain waters the shrubs and lawn. The present invention overcomes the above problem by placing the liquid repellent in a container and venting the vapors to the surrounding area. The vent is protected from rain or sprinkling with a cap that will not allow the water to run into the vent area. However, a small amount of water will not affect the repellent concentrate and the water will evaporate along with the repellent.

SUMMARY OF THE INVENTION

It is the object of this invention to provide a pet repellent device that will prevent the repellent from being dissipated by water.

It is another object of this invention to provide a pet repellent device that will allow pet repellent vapors to escape.

It is a further object of this invention to provide a low cost pet repellent device that will hold a pet repellent.

It is still a further object of this invention to provide a timed release system for pet repellent.

Briefly, in accordance with this invention, there is provided a pet repellent device with a container made from corrosion resistant metal or plastic and a filler neck on top of the container with a sealed cap. Two vents are located on the top of each end with cap above the vents to keep out rain or sprinkler water. The container is placed in the yard by a leg fastened to the middle of the container or a leg on each end fastened to the ends of the container.

The novel features which are believed to be characteristic of the invention, both as to its organization and method of operation, together with further objects and advantages thereof, will be better understood from the following description in connection with the accompanying drawings in which a presently preferred embodiment of the invention is illustrated by way of example. It is expressly understood, however, that the drawings are for purposes of illustration and description only, and are not intended as a definition of the limits of the invention.

BRIEF DESCRIPTION OF THE DRAWINGS

FIG. 1 is a side view of the pet repellent device.

FIG. 2 is a top view of the pet repellent device.

FIG. 3 is a view of one end of the pet repellent container showing the vent details with the cap removed.

FIG. 4 is a side view showing the details of the vent cap.

FIG. 5 is a section view A—A showing the details of the container filler neck and filler cap.

FIG. 6 is a section view B—B showing the details of the container vent system.

While the invention will be described in connection with the preferred embodiments, it will be understood that it is not intended to cover all the alternatives, modifications, and equivalents that may be included within the spirit and scope of the invention or described by the appended claims.

DETAILED DESCRIPTION OF THE INVENTION

Referring now to FIG. 1, there is shown a container generally indicated by 10, which holds pet repellent (not shown). The container shell 12 is shown to be an oblong cylinder sealed at both ends, however, it can be any shape such as a cube, a rectangular box shape or any shape that will hold liquid and vents can be placed on the top. In the preferred embodiment there are shown two vent gaps 14 and 16 which allow the vapors from the pet repellent to escape from the container 12. Vents 14 and 16 have vent caps 15 and 17 that completely cover the vent holes, one of such is shown in FIG. 3 as 19. The number of vents is not limited to two, however, there must be at least one vent in container 12. Container 12 also has a filler neck 18 with filler cap 20. Filler cap 20 is secured to filler neck 18 in the present invention by screw thread 23 on the filler neck and screw thread 25 on the cap as shown in FIG. 5. This is a safe means of securing cap 20 to filler neck 18 such as to prevent a child from opening the container 12 accidently. Other means of securing the cap 20 to the filler neck 18 are spring loaded overcenter cam caps which either stays open or shut or spring loaded clips such as those found on most automobile air cleaner containers. However, as stated above, the present invention provides screw means for securing the cap 20 to filler neck 18 which is considered to be the safest means of securing. FIG. 1 also shows legs 22 and 24 secured to the bottom of container 12. This configuration is believed to be the most stable when container 12 is placed on the ground, however, container 12 must have at least one leg attached to the center of container 12 and be pushed into the ground. Another configuration would be to use four legs (not shown) with two fastened to each end of container 12. If four legs are used and spaced apart on each end, much like a table, the legs could sit on top of the ground and not be required to be pushed into the ground to be secure. However, four legs would add to the expense of the Pet Repellent Device, therefore, the preferred embodiment has two legs, 22 and 24 as shown in FIG. 1. Legs 22 and 24 have barbs 26 and 28 to help hold the legs in the earth. Legs 22 and 24 are fastened to the bottom of container 12 by any suitable means, however, the preferred embodiment has circular disks 32 and 34 fixed to the bottom of container 12. Circular disks 32 and 34 may be bonded to container 12 if the material is plastic or welded, soldered or brazed if the container 12 is made from sheet metal. These disks 32 and 34 are drilled and threaded in the center. Legs 22 and 24 are also threaded on the top end of each leg to cooperatively engage the threaded portion of disks 32 and 34.

FIG. 2, generally shown as 40, shows the top of container 12 and caps 15 and 17. A cross section A—A of container 12 shows in FIG. 5 the details of the threads 23 in the filler neck and the threads 25 on the cap. A cross section B—B of container 12 shows in FIG. 6 the cross section of vent 14 and cap 15. It is noted that a ridge 42 is built up around vent 14. This prevents rain or sprinkler water from entering the vent 14 if the rain or sprinkler water is directed at an angle different than the vertical. It is also noted that cap 15 is larger than vent hole shown as 19 in FIG. 3. This also helps keep rain and sprinkler water from entering vent hole 19. FIG. 3 shows a broken end top view of container 12 with the cap 15 removed from over hole 19. The preferred embodiment has cross members 44, 46, 48 and 50 that support a threaded hole 52.

FIG. 4 shows a side view of the vent cap 15 and a bolt 54 fixed to cap 15. This bolt contains lock nut 56 that sets the gap between ridge 42 on container 12 and the bottom of cap 15. The external threads 58 on bolt 54 cooperatively engage the internal threads in hole 52. The cap is screwed down until the desired vent gap 14 of approximately ¼ inch is obtained. The lock nut is then tightened to fix the vent gap 14. While a vent gap 14 of approximately ¼ inch is preferred, the gap 14 could vary to a small fraction of an inch to the end of the threads of the bolt 54 which is approximately two inches. However, the larger the gap 14 the higher the probability of rain or sprinkler water entering container 12. If the gap 14 is too small, the vapors from the repellent will be chocked off and the device will not perform as intended. The material most preferred for manufacture of container 12 is a suitable plastic. It is envisioned that the upper half and lower half of container 12 is molded separately and thereafter bonded together to form closed container 12. The vent caps 14 and 15 and filler cap 20 are also molded separately with the bolt head on bolt 54 being molded into cap 15 as shown in FIG. 4. The bolt 54 and legs 22 and 24 are preferably made from corrosion resistant steel, however, it is possible to make bolt 54 and legs 22 and 24 from a suitable hard plastic. The container 12 may also be made from a corrosion resistant sheet metal such as galvanized steel, however, this type of construction would be more expensive than a molded plastic material. In order to make the container 12, cap 23 and vent caps 15 and 17 esthetically pleasing, a green color may be added to the plastic that would partially camouflage the container 12 among the shrubs. The type of repellent to be used in the preferred embodiment is like that used in the aforementioned Holiday ® Pet Repellent. This type of repellent contains oil of lemongrass, oil of Eucalyptus and oil of Geranium, all which are offensive to pets but harmless to humans. An inexpensive repellent that could be used is plain household ammonia and water which has proven to be effective as a pet repellent.

A time release repellent can also be used in combination with the container to afford excellent effectiveness and to insure that the vapors won't expel to the atmosphere in a short period of time. In addition, based on the amount of time release repellent placed in the container 10, service to the container 10 can be scheduled at a pre-determined time. This allows the user to be assured that there will be no periods when the vapors have completely expelled from the container 10. Time release repellent comes in several forms, however a time release system that would allow the liquid repellent to be released at various time intervals is preferred.

Thus, it is apparent that there has been provided a pet repellent device that fully satisfied the objectives, aims and advantages set forth above, while the invention has been described in conjunction with specific embodiments thereof, it is evident that many alternatives, modifications, and variations will be apparent to those skilled in the art in light of the aforegoing description. Accordingly, it is intended to embrace all such alternatives, modifications and variations that fall within the apirit and scope of the appended claims.

What is claimed is:

1. A device for holding and dispensing pet repellent comprising:
   pet repellent;
   a container for holding said repellent;
   means for standing said container on the ground;
   venting means consisting of two holes in the top of said container;
   a vent cap symetrically located over each of said holes, said vent cap having a hemispherical dome shape slightly larger than said holes on the top of said container;
   adjusting means of said venting means, said adjusting means of said venting means consisting of a bolt with a locknut attached thereto, said bolt mating with a nut attached to a web member in said holes in said container whereby turning said bolt and adjusting and tightening said locknut changes and fixes the gap between said cap and a circular ridge on said container and therefore changes the rate of venting said repellent to the atmosphere.

* * * * *